United States Patent [19]

Huynh et al.

[11] Patent Number: 4,752,866

[45] Date of Patent: Jun. 21, 1988

[54] OZONATOR POWER SUPPLY EMPLOYING A CURRENT SOURCE INVERTER

[75] Inventors: Anh N. Huynh, Edgewood, Ky.; Phoivos D. Ziogas, Brossard, Canada

[73] Assignee: National Distillers and Chemical Corporation, New York, N.Y.

[21] Appl. No.: 12,983

[22] Filed: Feb. 10, 1987

Related U.S. Application Data

[63] Continuation of Ser. No. 725,735, Apr. 22, 1985.

[51] Int. Cl.⁴ .......................................... H02M 7/521
[52] U.S. Cl. ..................................... 363/138; 363/28; 363/96; 422/186.16
[58] Field of Search .................. 323/266; 363/17, 27, 363/28, 80, 96, 98, 136, 138; 422/186.15, 186.16

[56] References Cited

U.S. PATENT DOCUMENTS

| | | | |
|---|---|---|---|
| 3,496,092 | 2/1970 | Fraser | 422/186.16 |
| 3,737,755 | 6/1973 | Calkin et al. | 363/17 |
| 4,251,857 | 2/1981 | Shelly | 363/124 |

FOREIGN PATENT DOCUMENTS

2929601 1/1981 Fed. Rep. of Germany .

OTHER PUBLICATIONS

Bixby et al., "SCR Applications Handbook"; International Rectifier; Chapter 8 or pp. 283-309.

Primary Examiner—Patrick R. Salce
Assistant Examiner—Jeffrey Sterrett
Attorney, Agent, or Firm—Kenneth D. Tremain; Gerald A. Baracka

[57] ABSTRACT

A versatile current source inverter power supply for an ozonator in which a gating control circuit controls the gating of a thyristor bridge inverter power supply in a manner in which the output current to the ozonator is controlled and regulated. The current source inverter power supply circuit includes a DC/AC thyristor bridge inverter circuit coupled at its input terminals to a direct current power source and at its output terminals to an electrical network which includes the capacitative ozonator load. The thyristor bridge inverter includes a first pair of thyristors and diodes coupled to conduct current in a first direction through the electrical network, and a second pair of thyristors and diodes coupled to conduct current in a second, opposite direction through the electrical network. The electrical network includes a step up high voltage transformer, with its primary winding coupled to the thyristor bridge inverter and its secondary winding coupled to the ozonator load. First and second commutating capacitors are connected across the first and second pairs of thyristors for commutating off the thyristors. An adjustable current pulse amplitude conrol circuit is provided for controlling the amplitude of current pulses supplied through the thyristor bridge to the ozonator load.

21 Claims, 5 Drawing Sheets

OZONATOR POWER SUPPLY EMPLOYING A CURRENT SOURCE INVERTER

This is a continuation of patent application Ser. No. 725,735 "now pending", filed Apr. 22, 1985.

BACKGROUND OF THE INVENTION

1. Field of the Invention

The present invention relates generally to a solid state power supply circuit for a corona discharge device such as an ozonator, and more particularly pertains to a thyristor inverter power supply circuit employing a current source inverter with controlled gating of the thyristors.

2. Description of the Prior Art

It is known in the art that ozone can be produced by the passage of oxygen or air between two electrodes, between which an electrical corona discharge is maintained. Other processes for producing ozone, such as by spark discharge or by action of ultra-violet radiation, have not been of great industrial significance because the ozone yield is considerably lower. The production of ozone by a corona discharge is of considerable importance in broad areas of industry, for water treatment in the preparation of drinking water, and for water purification and sterilization.

The basic physical principles for synthesizing ozone by passing pure oxygen or other oxygen-containing gases such as air through a corona discharge device have been known for many years. In a typical corona discharge ozonator, a corona discharge is maintained across a gap between two electrodes and is characterized by a low current induced by a sufficiently large voltage gradient to cause an electrical corona discharge across the gas. The gas is only slightly ionized thereby and a diffused soft bluish glow results. The high voltages employed to operate corona discharge ozonators have frequently been obtained by passing a periodic signal of some type through the primary side of a step-up power transformer, and connecting the ozonator load across the periodic high voltage available on the secondary side of the transformer.

Over the years, significant efforts have been made to refine ozone generators and the power supplies therefor which form an integral part of their operating circuitry. These efforts have been particularly directed at increasing their efficiency to reduce both their cost of operation and the cost of manufacture of ozone per unit of power consumed. Many factors have contributed to setting prior art limitations of efficiency, including the characteristics of the voltage and current periodic waveforms.

Ozone forms according to a triple collision theory, pursuant to which oxygen molecules are accelerated in an alternating electric field, and three molecules of oxygen ($O_2$) reform to two molecules of ozone ($O_3$). The formation of ozone generally occurs in the last part of an acceleration phase when the corona discharge has built up a sufficient field strength, which occurs relatively late with sinusoidal AC voltages furnished from a commercial AC line voltage, or from a voltage derived therefrom in a multiplying operation producing a frequency of up to several hundred hertz.

Ozone generating systems operating at higher frequencies generally produce higher ozone yields, with normal AC line voltage, since the acceleration per unit time appears more frequently. However, because the corona power dissipated in a gaseous gap in series with a dielectric barrier is directly proportional to the operating frequency, any significant heating produced by this corona power tends to promote the rapid decomposition of ozone produced therein. Thus, the duration of the discharge in relation to the duration of the period of the alternating current applied to the ozonator is an important factor in the efficiency of the production of ozone.

SUMMARY OF THE INVENTION

It is a primary object of the present invention to provide a versatile current source inverter power supply for an ozonator which results in the efficient operation thereof.

Another object of the subject invention is the provision of a gating control circuit for a thyristor bridge inverter power supply for an ozonator wherein the output current can be controlled and regulated.

In accordance with the teachings herein, a current source inverter power supply circuit includes a DC/AC thyristor bridge inverter circuit coupled at its input terminals to a direct current power source and at its output terminals to an electrical network which includes the capacitative ozonator load. The thyristor bridge inverter includes a first pair of thyristors and diodes coupled to conduct current in a first direction through the electrical network, and a second pair of thyristors and diodes coupled to conduct current in a second, opposite direction through the electrical network. The electrical network includes a step up high voltage transformer, with its primary winding coupled to the thyristor bridge inverter and its secondary winding coupled to the ozonator load. First and second commutating capacitors are connected across the first and second pairs of thyristors for commutating off the thyristors.

A control circuit generates gating control signals for the first and second pairs of thyristors. The gating control circuit controls the width of the positive current pulses supplied to the ozonator load by gating the first pair of thyristors on, and then by commutating them off by controlling the timing of a gating signal applied to at least one of the second pair of thyristors, which connects a charged capacitor across and reverse biases at least one of the first pair of thyristors. Similarly, the gating control circuit controls the width of the negative current pulses supplied to the ozonator load by gating the second pair of thyristors on, and then by commutating them off by controlling the timing of a gating signal applied to at least one of the first pair of thyristors, which connects a charged capacitor across and reverse biases at least one of the second pair of thyristors.

In accordance with one novel aspect of the present invention, the control circuit includes an adjustable current pulse amplitude control circuit for controlling the amplitude of current pulses supplied through the thyristor bridge to the ozonator load. This current pulse amplitude control circuit generates a square wave output signal in accordance with its input signals, with the width of the pulses therein being selectively controllable to control thereby the amplitude of the current pulses supplied through the thyristor bridge to the ozonator load. A power amplifier is coupled to the output of the square wave generating circuit through an optoisolator, and an inductor is coupled to the output of the amplifier to smooth and filter the current supplied therethrough to the thyristor bridge.

In accordance with another novel aspect of the present invention, the control circuit includes a regulating pulse width modulating circuit for producing first and second out of phase square wave signals, and the widths of the pulses in the first and second square wave signals are variable to vary the timing of the gating signals. The regulating pulse width modulator circuit is also controllable to control the frequency of generation of the first and second out of phase square wave signals, and thereby controls the width of the positive and negative current pulses applied to the ozonator.

In one disclosed embodiment of the control circuit, at least one trailing edge detector circuit detects the trailing edges of the pulses in the first square wave signal, and similarly at least one trailing edge detector circuit detects the trailing edges of the pulses in the second square wave signal. In greater detail, a first inverter is coupled to the first out of phase square wave signal and an additional trailing edge detector circuit detects the trailing edges of the pulses in the first inverted out of phase square wave signal. Similarly, a second inverter is also coupled to the second out of phase square wave signal, and an additional trailing edge detector circuit detects the trailing edges of the pulses in the second inverted out of phase square wave signal.

Pursuant to the teachings herein, a direct current detecting circuit detects the DC output current from the DC power source to the current source inverter. A current pulse amplitude control circuit controls the output current of the DC power source depending upon a comparison of the output of the direct current detecting circuit with a reference set point. A pulse width control logic circuit controls the frequency and the width of the alternating polarity current produced by the current source inverter. A DC inductor is connected between the DC power source and the current source inverter for providing a low ripple in the DC bus current and a starting circuit (not shown) for the current source inverter. The ozonator load has an equivalent electrical circuit comprising a capacitor $C_d$ of the dielectric barrier, normally glass, connected in series with a capacitor $C_g$ of the air gap, connected across the secondary winding of the high voltage transformer, and has a conductance path, represented by $R_g$, when the corona discharge occurs.

BRIEF DESCRIPTION OF THE DRAWINGS

The foregoing objects and advantages of the present invention for a solid state power supply and control circuit for an ozonator may be more readily under stood by one skilled in the art, with reference being had to the following detailed description of several preferred embodiments thereof, taken in conjunction with the accompanying drawings wherein like elements are designated by identical reference numerals throughout the several views, and in which.

DETAILED DESCRIPTION OF THE INVENTION

The power supply circuit of the present invention is designed to provide an ozonator load with substantially square current pulses of alternating polarity. The ozonator power supply pursuant to the subject invention is particularly versatile, as the pulse repetition frequency of the current pulse train is adjustable, along with both the pulse width and the pulse height of the individual current pulses therein.

The schematic circuits disclosed herein give the values of many of the resistors and capacitors shown therein, and additionally give the commercial designations of many of the diodes, transistors and integrated circuits which are a part of the circuits. In the latter case, the pin numbers of the individual integrated circuits are also indicated in many of the circuits.

Figure 1:
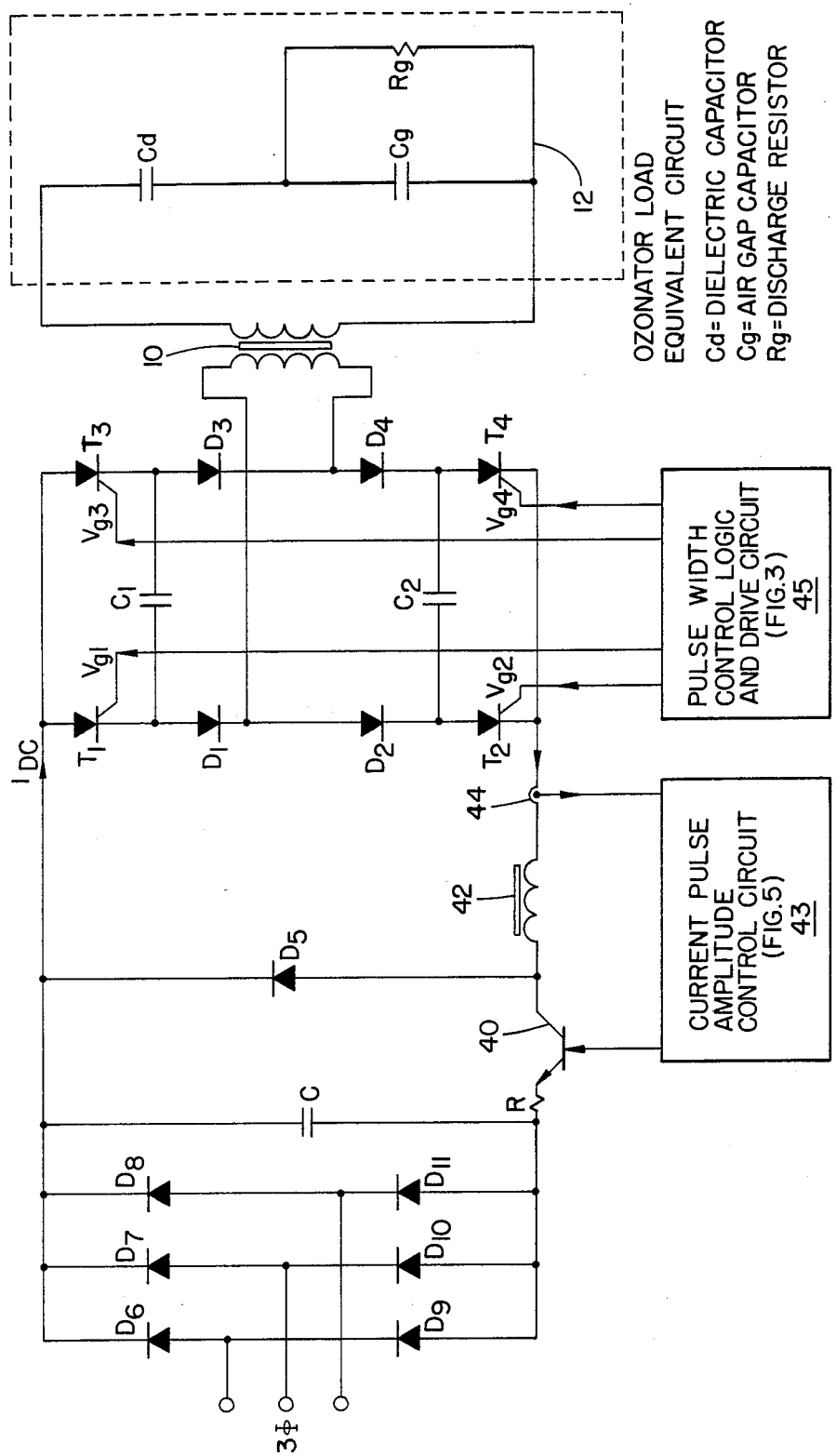
FIG. 1 is a circuit diagram of an exemplary embodiment of a solid state power supply and control circuit for an ozonator in accordance with the subject invention.

Referring to FIG. 1, a commercial three phase 220 V AC power main is rectified by a three phase diode bridge to produce a DC voltage, for example 300 V, across the filter capacitor C, which is applied to DC/DC chopper comprising a power transistor 40, a fast switching diode $D_5$, a DC inductor 42, a current pulse amplitude control circuit 43, and a direct current detector 44. A pulse width modulated current source inverter includes four thyristor-diode pairs $T_1 D_1$, $T_2 D_2$, $T_3 D_3$, and $T_4 D_4$, connected in a bridge configuration to convert a direct current from the DC power source to a square current of alternating polarity which is supplied to the ozonator load 12 through the high voltage transformer 10. The operation of the pulse width modulated current source inverter is controlled by a control logic and drive circuit 45 which supplies gating signals to the thyristors as described hereinbelow.

A thyristor is an electronic switching device which is triggered on by a gate pulse to turn it on in a high conduction mode. Once the thyristor is triggered into conducting a forward current, a gate signal is no longer required to maintain the device in conduction, and removal of the gate current does not affect the conduction of the forward current. The thyristor will return to its original forward blocking state if the forward current becomes zero (called natural commutation) or if it is forced to become zero (called forced commutation).

The thyristors, which are preferably silicon controlled rectifiers (SCRs), are used as the main switching devices for the current source inverter, and commutation of the thyristors is accomplished by the capacitors $C_1$ and $C_2$ connected as shown in FIG. 1.

Figure 2:
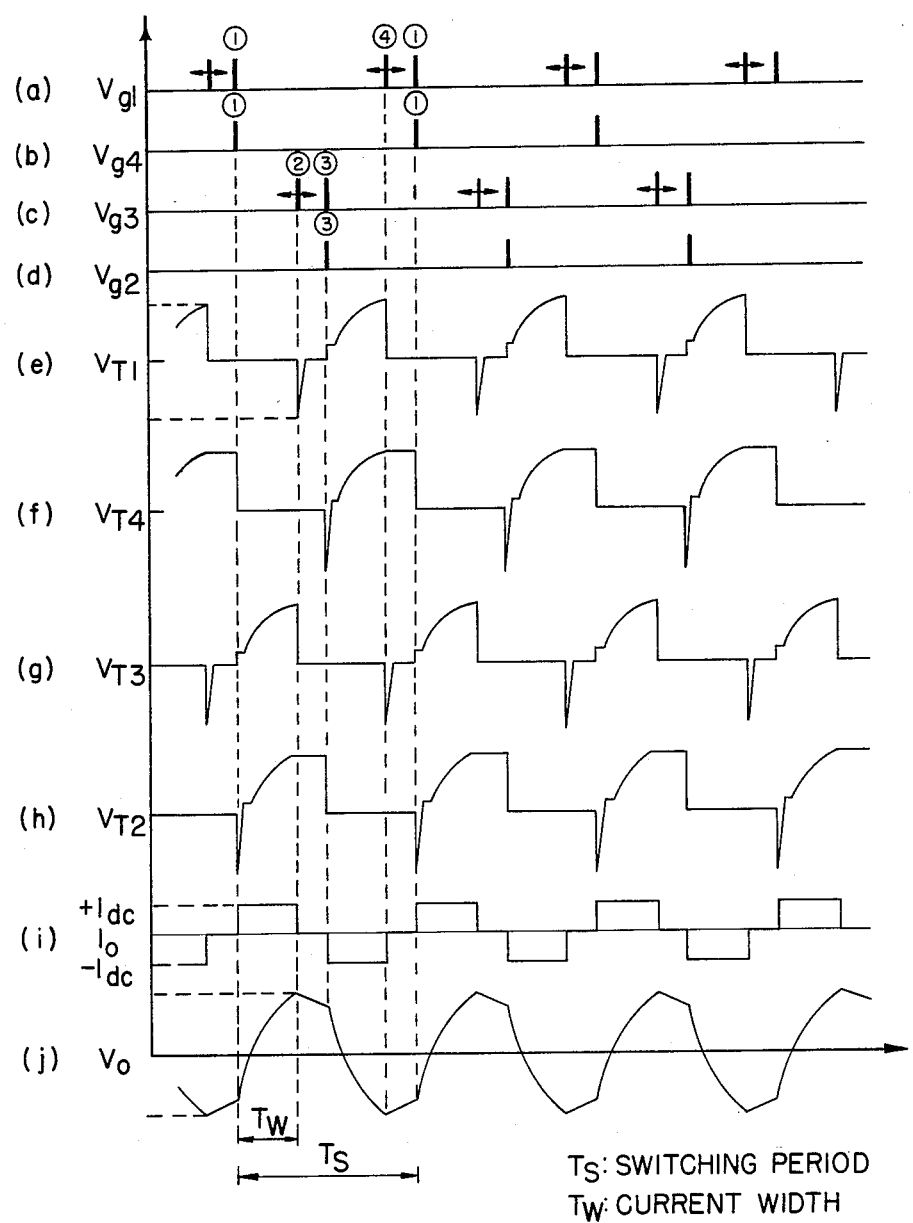
FIG. 2 illustrates various waveforms which are associated with and are useful in explaining the operation of the current source inverter circuit of FIG. 1.

The operation of the power supply circuit will now be explained. In the pulse width modulated mode of operation, thyristors $T_1$ and $T_4$ are turned on by pulse 1 of the gating pulses $V_{g1}$, $V_{g4}$, (FIG. 2a, 2b), and a constant current equal to $I_{DC}$ flows from the positive side to the negative side of the DC power source, through the primary side of the transformer in a first direction. The commutating capacitors $C_1$ and $C_2$ are effectively connected in parallel across the ozonator load, and consequently are charged to a voltage which is equal at least to the DC voltage. Thyristor $T_1$ is commutated off by the charged commutating voltage of $C_1$ applied across $T_1$ as a reverse voltage when thyristor $T_3$ is triggered by pulse 2 of the gating pulse $V_{g3}$ (FIG. 2c), stopping the flow of current in the common branch of the bridge. After a short time period, thyristor $T_2$ is triggered on by pulse 3 of the gating pulse $V_{g2}$ (FIG. 2d) and thyristor $T_3$ is triggered on by pulse 3 of the gating pulse $V_{g3}$ (FIG. 2C), and thyristor $T_4$ is commutated off by the charged commutating voltage of $C_2$ applied across $T_4$ as a reverse voltage. Now thyristors $T_2$ and $T_3$ are both on, and a constant current $-I_{dc}$ flows from the positive side to the negative side of the DC power source, through the primary side of the transformer in a second opposite direction. The commutating capacitors $C_1$ and $C_2$ are charged again but with an opposite polarity. Thyristor $T_3$ is commutated off by the charging voltage of $C_1$ when thyristor $T_1$ is triggered by pulse 4 of the gating pulse $V_{g1}$, causing the flow of current to stop through the primary side of the transformer. At the beginning of the next switching period, thyristors $T_1$ and $T_4$ are triggered again by pulses 1 of the gating pulses $V_{g1}$ and $V_{g4}$, and the cycle of operation is then repeated. FIGS. 2(e), (f), (g), (h) show the voltage waveforms of the thyristors $T_1$, $T_2$, $T_3$ and $T_4$. Consequently, by alternately turning on and turning off of a first pair of thyristors $T_1$, $T_4$ and a second pair of thyristors $T_2$, $T_3$ in a constant cycle called a switching period, a rectangular waveform alternating current with a variable width (determined by the relative positions of pulses 2 and 4) as shown in FIG. 2i, and an alternating voltage, as shown in FIG. 2j, are imposed on the ozonator load.

Figure 3:
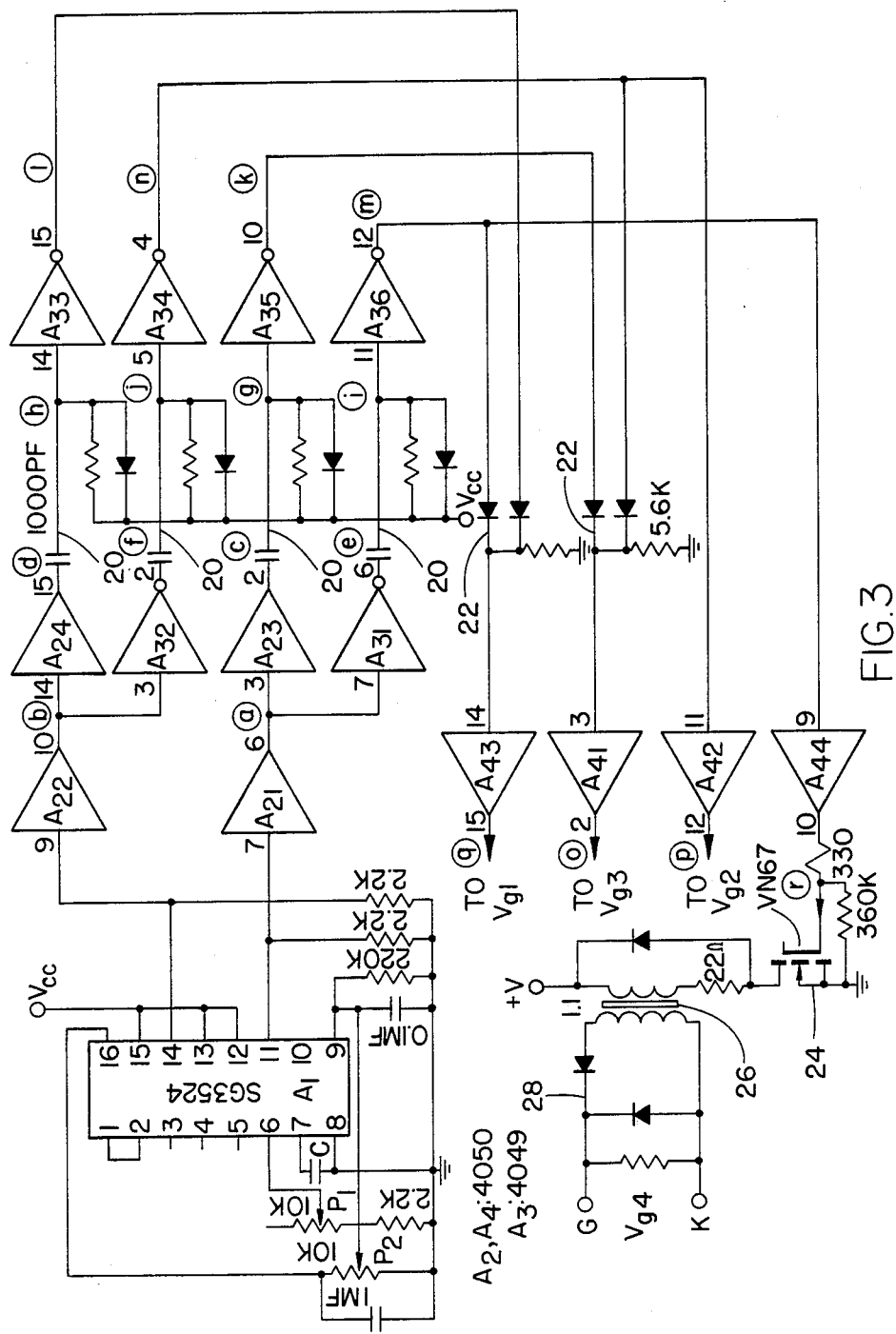
FIG. 3 is an exemplary inverter control circuit pursuant to the teachings of the present invention for controlling the operation of a current source inverter circuit.
Figure 4:
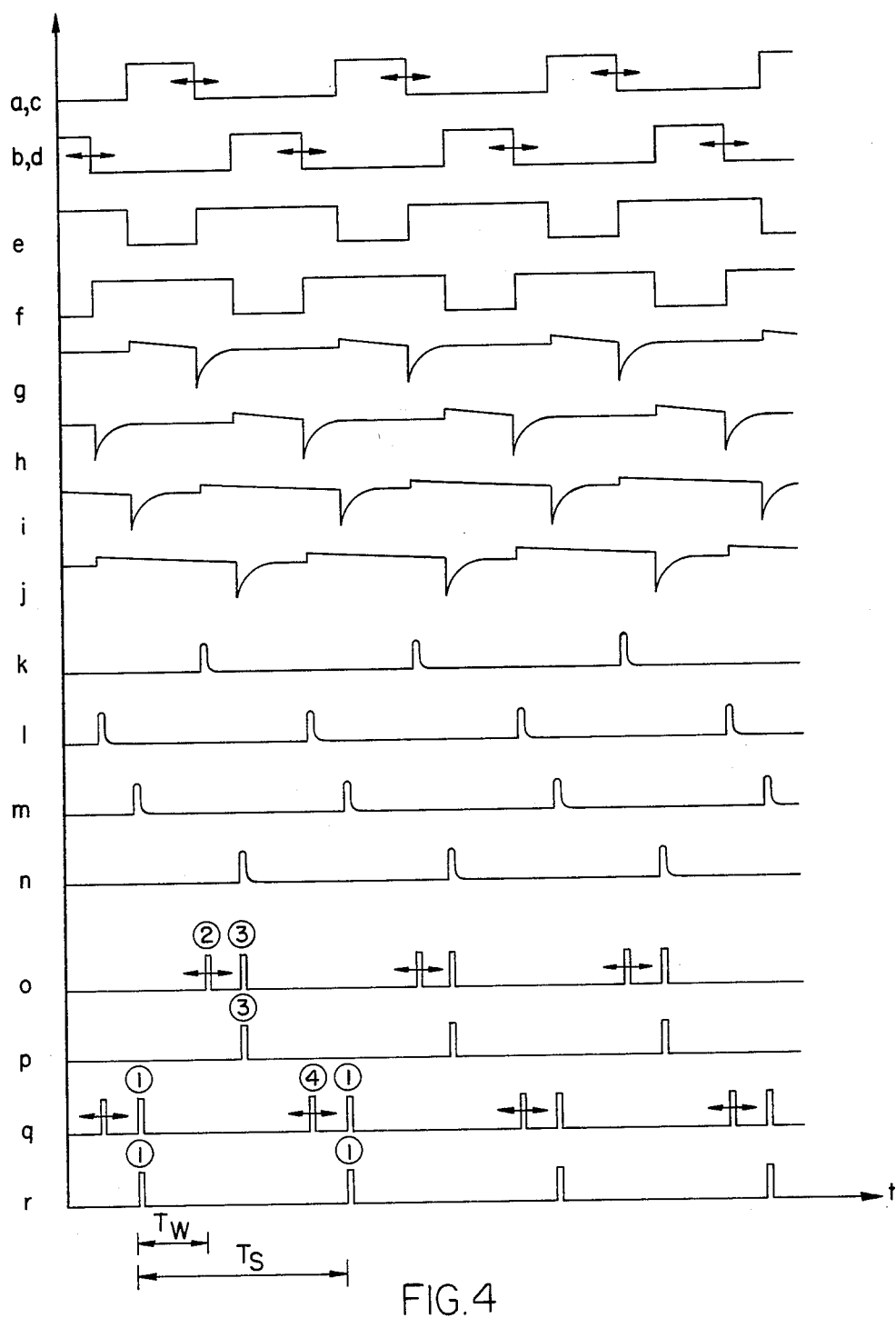
FIG. 4 illustrates various waveforms which are associated with and are useful in explaining the operation of the control circuit of FIG. 3.

The inverter control circuit of FIG. 3 utilizes an SG3524 ($A_1$) regulating pulse width modulator integrated cirucit in conjunction with a 4049 ($A_3$) hex inverting buffer integrated circuit and two 4050 ($A_2$, $A_4$) hex noninverting buffer integrated circuits. The control circuit is designed and implemented to produce the required gating pulses as shown in FIGS. 4(o), 4(p), 4(q), and 4(r) for triggering the thyristors of the current source inverter circuit. A schematic diagram of the control circuit and the waveforms therefor are shown respectively in FIG. 3 and FIG. 4.

The SG3524 integrated circuit functions to generate two 180° out of phase square wave signals (a) and (b), FIGS. 4(a) and 4(b), which are buffered by two noninverting buffers $A_{21}$ and $A_{22}$. The frequency and the width of these signals are manually controllable by the potentiometers $P_1$ and $P_2$ respectively, connected as shown. From the output of $A_{21}$, the (a) signal is divided, one portion is buffered again by $A_{23}$, and the other portion is inverted and buffered by $A_{31}$. From the output of $A_{22}$, the (b) signal is divided, one portion is buffered again by $A_{24}$ and the other portion is inverted and buffered by $A_{32}$. At the outputs of $A_{23}$, $A_{31}$, $A_{24}$, and $A_{32}$, there are four different signals, FIGS. 4(c), 4(d), 4(e), and 4(f), which are edge detected by RC differentiating circuits 20 in order to provide four different pulses, FIGS. 4(g), 4(h), (i), and (j), at the input of IC $A_3$. These signals are inverted and shaped by $A_{33}$, $A_{34}$, $A_{35}$, and $A_{36}$, to produce two pairs of positive pulses, FIGS. 4(k), 4(n), and 4(l), 4(m), at their outputs. The (k) and (l) pulses are movably controlled by $P_2$, and the (m) and (n) pulses are fixed. The fixed pulses (n) and (m) are buffered by two noninverting buffers $A_{42}$ and $A_{44}$. The movable pulses (k) and (l) and the fixed pulses (n) and (m) are respectively ORed by diode OR circuits 22. The fixed pulse m and the movable pulse 1 are effectively added together by the top pair of OR diodes, as shown by FIG. 4(q), and the fixed pulse n and the movable pulse k are effectively added together by the bottom pair of OR diodes as shown in FIG. 4(o). These mixed pulses are then buffered by two noninverting buffers $A_{41}$ and $A_{43}$.

At the output of the $A_4$ integrated circuit, there are two pairs of pulses, FIGS. 4(o), 4(p), and 4(q), 4(r), 180° out of phase, each of which is amplified and isolated by a transistor amplifier stage as follows. Each of the output signals of the 4050 IC($A_4$) is amplified by one of four transistor amplifiers 24, only one of which is shown in FIG. 3. These amplified pulses are isolated by pulse transformers 26 and rectified at 28 before being applied to the gates of the thyristors. Only the processing of the lowermost control signal $V_{g4}$ for thyristor $T_4$ is illustrated in FIG. 3, with the other signals (q), (o), and (p) being applied to similar circuits. The pulses (o) and (p) are used to trigger the thyristors $T_3$ and $T_2$, respectively, while the pulses (q) and (r) are used to trigger the thyristors $T_1$ and $T_4$, respectively.

Figure 5:
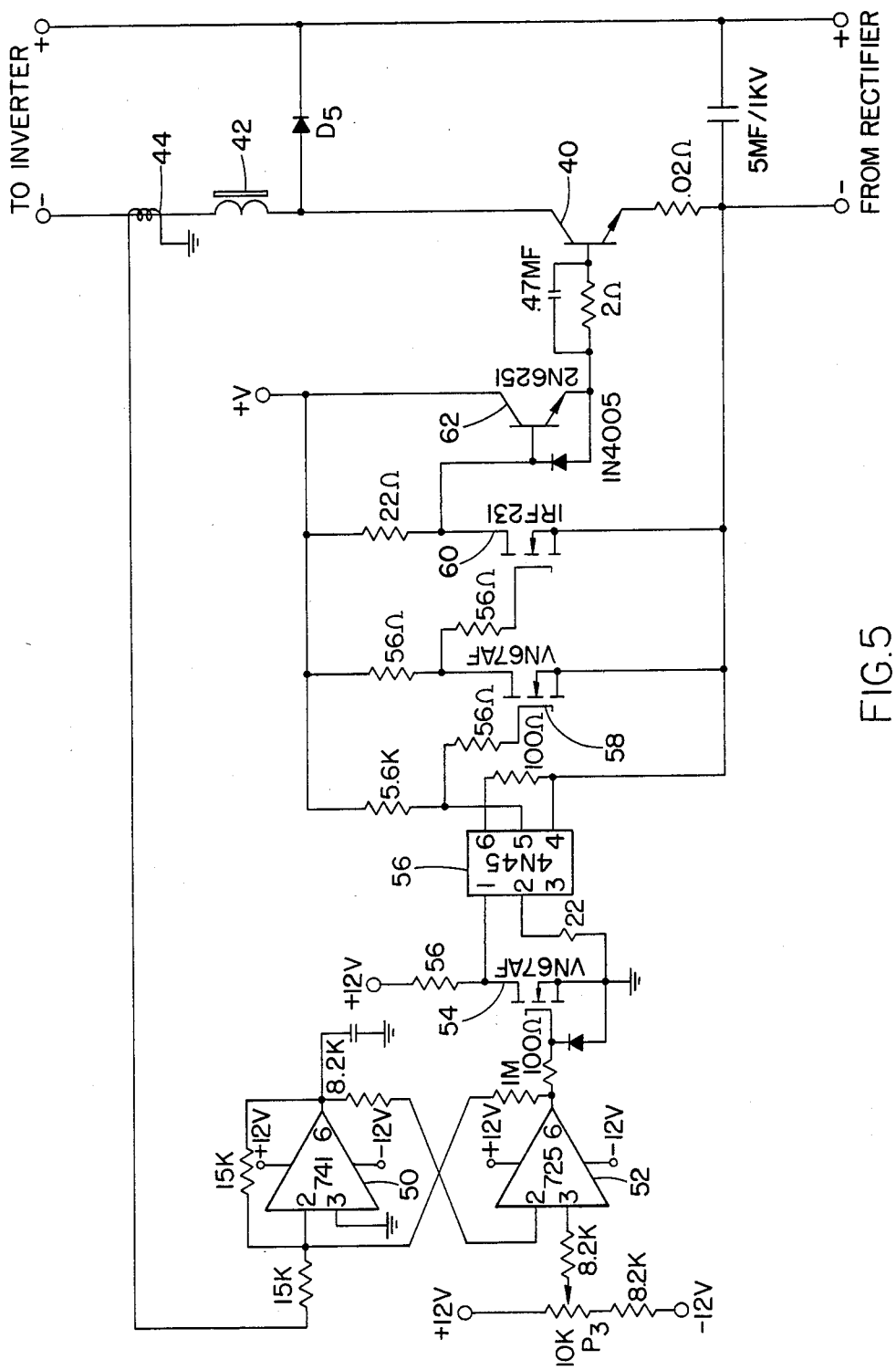
FIG. 5 is a schematic circuit of an exemplary embodiment of a current pulse amplitude control circuit pursuant to the present invention.

FIG. 5 illustrates a schematic circuit of a DC/DC chopper circuit for controlling the amplitude of the current pulses supplied to the ozonator load. A power transistor 40, used as a switching device, supplies a regulated DC current to the inverter through a relatively large reactance 42. A free wheeling diode $D_5$ is provided to release the energy stored in the inductor 42 when the power transistor 40 is turned off. The logic circuit of FIG. 5 controls the current supplied through transistor 40 as follows. Two operational amplifiers 50 and 52 are coupled to generate a fixed frequency square wave output signal in accordance with two input signals applied thereto. One input signal to operational amplifier 50 is a feedback signal from the current sensor 44, as illustrated in both FIGS. 1 and 5, while one input signal to operational amplifier 52 is adjustable according to the setting of a potentiometer P3. The setting of potentiometer P3 controls the amplitude of the ozonator current by controlling the width of the individual pulses in the output pulse train, while the signal from the current sensor 44 serves as a feedback signal to ensure proper and stable operation of the circuit.

The square wave output signal from operational amplifiers 50 and 52 is directed to a transistor amplifier 54, the output of which is directed to an optical coupler or isolation circuit 56. The output of the isolation coupler 56 is directed through three stages of transistor amplifiers 58, 60, 62, the output of which is coupled to the base of the power transistor 40. This circuit effectively controls the magnitude of the current supplied to the thyristors $T_1$, $T_2$, $T_3$ and $T_4$ in accordance with the setting of potentiometer P3.

In preferred embodiments of the present invention, the current pulse repetition frequency is adjustable between 100 Hz and 800 Hz, the current pulse width is adjustable between one-third of one-half cycle and one-half cycle, and the current pulse height is adjustable between one and ten amps.

While several embodiments and variations of the present invention for a current source inverter power supply circuit are described in detail herein, it would be apparent that the disclosure and teachings of the present invention will suggest many alternative designs to those skilled in the art.

What is claimed is:

1. A current source inverter power supply circuit for supplying substantially rectangular current pulses of alternating polarity, alternating in a cycle from a zero current base level to a positive rectangular current pulse, returning to the zero current base level for a period of time, and then alternating to a negative rectangular current pulse, and then returning to the zero current base level for a period of time, and then repeating the cycle to generate rectangular current pulses of alternating polarity for an ozonator, comprising:

(a) a DC/AC semiconductor switch bridge inverter coupled at its input terminals to a direct current power source and at its output terminals to an electrical network, said semiconductor switch bridge inverter comprising a first pair of semiconductor switches and diodes coupled to conduct current in a first direction through the electrical network, and a second pair of semiconductor switches and diodes coupled to conduct current in a second direction, opposite said first direction, through the electrical network, with each semiconductor switch having a positive electrode, a negative electrode, and a gate control electrode;

(b) first and second commutating capacitors for commutating off said semiconductor switches, with said first and second capacitors being connected respectively across said first and second pairs of semiconductor switches;

(c) said electrical network having a step up high voltage transformer, with its primary winding coupled to said semiconductor switch bridge inverter and its secondary winding coupled to the ozonator;

(d) a gating control cirucit for generating control signals for said first and second pairs of semiconductor switches, said gating control circuit controlling the width of the positive substantially rectangular current pulses conducted through the ozonator load by gating said first pair of semiconductor switches on, by applying gating signals to the gating electrodes thereof, and then commutating at least one of said first pair of semiconductor switches off to return to the zero current base level for a period of time by controlling the timing of a gating signal applied to the gating electrode of at least one of said second pair of semiconductor switches, which connects a charged capacitor across and reverse biases at least one of the first pair of semiconductor switches, and said gating control circuit controlling the width of the negative substantially rectangular current pulses conducted through the ozonator load by gating said second pair of semiconductor switches on, by applying gating signals to the gating electrodes thereof, and then commutating at least one of said second pair of semiconductor switches off to return to the zero current base level for a period of time by controlling the timing of a gating signal applied to the gate electrode of at least one of said first pair of semiconductor switches, which connects a charged capacitor across and reverse biases at least one of the second pair of semiconductor switches, said control circuit including a pulse width modulating circuit for producing first and second out of phase square wave signals at the same frequency, with the frequency of the first and second out of phase square wave signals determining the frequency of the gating control signals, and thereby of the positive and negative rectangular current pulses conducted through the ozonator load, and the width of the pulses in the first and second out of phase square wave signals being variable to vary the timing of the generation of said gating signals employed for commutation, and thereby the width of the positive and negative rectangular current pulses conducted through the ozonator load.

2. A current source inverted power supply circuit for an ozonator as claimed in claim 1, said gating control circuit including means for differentiating said first and second out of phase square waves to produce gating pulses of a constant width for controlling said semiconductor switches, and means for summing said gating pulses to produce two pairs of gating pulses for controlling said first and second pairs of semiconductor switches, with each pair of gating pulses containing one fixed pulse and one movable pulse.

3. A current source inverter power supply cirucit for an ozonator as claimed in claim 2, wherein said summing means is an OR gate, and said differentiating means is a resistor-capacitor-diode network.

4. A current source inverter power supply circuit for an ozonator as claimed in claim 1, each semiconductor switch comprising a thyristor.

5. A current source inverter power supply circuit for an ozonator as claimed in claim 1, further comprising at least one trailing edge detector circuit for detecting the trailing edges of the pulses in the first out of phase square wave signal, and at least one trailing edge detector circuit for detecting the trailing edges of the pulses in the second out of phase square wave signal.

6. A current source inverter power supply circuit for an ozonator as claimed in claim 5, further comprising a first inverter coupled in between the first out of phase square wave signal and a trailing edge detector circuit for detecting the trailing edges of the pulses in a first inverted out of phase square wave signal, and a second inverter coupled in between the second out of phase square wave signal and a trailing edge detector circuit for detecting the trailing edges of the pulses in a second inverted out of phase square wave signal.

7. A current source inverter power supply circuit for an ozonator as claimed in claim 6, wherein the trailing edges of the pulses in the first square wave signal and the trailing edges of the pulses in the second wave signal vary with the width of the pulses, whereas the trailing edges of the first inverted out of phase square wave signal and the trailing edges of the second inverted out of phase square wave signal are nonvariable with the width of the pulses, and the outpout of trailing edge detector circuit for a variable trailing edge is combined with the output of trailing edge detector circuit for a nonvariable trailing edge, to vary and control the timing of the generation of said gating signals.

8. A current source inverter power supply circuit for an ozonator as claimed in claim 1, wherein said pulse width modulator circuit is controllable to control the frequency of the first and second out of phase square wave signals, and thereby the frequency of the positive and negative current pulses applied to the ozonator.

9. A current source inverter power supply for an ozonator as claimed in claim 8, further including a current pulse amplitude control circuit having its input coupled to a relatively fixed source of DC voltage, and its output coupled to the semiconductor switch bridge inverter, for supplying current to the semiconductor switch bridge and the ozonator by controlling the amplitude of current pulses supplied through the adjustable current pulse amplitude control circuit to the semiconductor switch bridge inverter and the ozonator.

10. A current source inverter power supply circuit for an ozonator as claimed in claim 9, said adjustable current pulse amplitude control circuit comprising a current detector means for detecting the current supplied through said semiconductor switch bridge inverter to obtain a current signal, means for producing a direct current voltage source, and oscillator means for generating an output control signal for controlling the amplitude of the substantially rectangular current pulses of alternating polarity in accordance with said direct current voltage source and said current signal.

11. A current source inverter power supply circuit for an ozonator as claimed in claim 10, said oscillator means comprising first and second operational amplifiers coupled together to generate said output control signal, said first operational amplifier having an input from said current detector means and said second operational having an input from said direct current voltage source means.

12. A current source inverter power supply circuit for an ozonator as claimed in claim 9, said current pulse amplitude control circuit comprising a circuit means for generating a square wave output signal, with the circuit means being adjustable to control the width of the pulses in the square wave output signal and thereby the amplitude of the current pulses applied to the ozonator.

13. A current source inverter power supply circuit for an ozonator as claimed in claim 12, wherein said means for generating a square wave comprises first and second operational amplifiers coupled together to generate a fixed frequency square wave, said first operational amplifier having an input from a current sensor which senses the current supplied to the semiconductor switches, and said second operational amplifier having an input from a control resistor, the magnitude of the resistance of which controls the current supplied to the ozonator by controlling the width of the pulses in the square wave output signal.

14. A current source inverter power supply circuit for an ozonator as claimed in claim 13, further comprising an amplifier means coupled to the output of said square wave circuit generating means, and an inductor coupled to the output of said amplifier means for smoothing and filtering the current supplied therethrough to the semiconductor switch bridge inverter.

15. A current source inverter power supply circuit for supplying substantially rectangular current pulses of altnerating polarity, alternating in a cycle from a zero current base level to a positive rectangular current pulse, returning to the zero current base level for a period of time, and then alternating to a negative rectangular current pulse, and then returning to the zero current base level for a period of time, and then repeating the cycle to generate substantially rectangular current pulses of alternating polarity for an ozonator, comprising:

(a) a DC/AC semicodnuctor switch bridge inverter coupled at its input terminals to a direct current power source and at its output terminals to an electrical network, said semiconductor switch bridge inverter comprising a first pair of semiconductor switches and diodes coupled to conduct current in a direction through the electrical network, and a seocnd pair of semiconductor switches and diodes coupled to conduct current in a second direction, opposite said first direction, through the electrical network, with each semiconductor switch having a positive electrode, a negative electrode, and a gate control electrode;

(b) first and second commutating capacitors for commutating off said semiconductors switches with said first and second capacitors being connected respectively across said first and second pairs of semiconductor switches;

(c) said electrical network having a step up high voltage transformer, with its primary winding coupled to said semiconductor switch bridge inverter and its secondary winding coupled to the ozonator;

(d) a gating control circuit for generating gating control signals for said first and second pairs of semiconductor switches, said gating control circuit controlling the width of the positive substantially rectangular current pulses conducted through the ozonator load by gating said first pair of semiconductor switches on, by applying gating signals to the gating electrodes thereof, and then commutating at least one of said first pair of semiconductor switches off to return to the zero current base level for a period of time by controlling the timing of a gating signal applied to the gate electrode of at least one of said second pair of semiconductor switches, which connects a charged capacitor across and reverse biases at least one of the first pair of semiconductor switches, and said gating control circuit controlling the width of the negative substantially rectangular current pulses conducted through the ozonator load by gating said second pair of semiconductor switches on, by applying gating signals to the gating electrodes thereof, and then commutating at least one of said second pair of semiconductor switches off to return to the zero current base level for a period of time by controlling the timing of a gating signal applied to the gate electrode of at least one of said first pair of semiconductor switches, which connects a charged capacitor across and reverse biases at least one of the second pair of semiconductor switches; and (e) an adjustable current pulse amplitude control circuit, having its input coupled to a source of DC voltage and its output coupled to the semiconductor switch bridge inverter for supplying current to the semiconductor switch bridge and the ozonator and controlling the electrical power supplied to the semiconductor switch bridge and the ozonator by controlling the amplitude of current pulses supplied through the adjustable current pulse amplitude control circuit to the semiconductor switch bridge and the ozonator.

16. A current source inverter power supply circuit for an ozonator as claimed in claim 15, each semiconductor switch comprising a thyristor.

17. A current source inverter power supply circuit for an ozonator as claimed in claim 15, said current pulse amplitude control circuit comprising a circuit means for generating a square wave output signal in accordance with its input signals, with the circuit means being adjustable to control the width of the pulses in the square wave output signal and thereby the amplitude of the current pulses applied to the ozonator thorugh said semiconductors switches.

18. A current source inverter power supply circuit for an ozonator as claimed in claim 17, wherein said means for generating a square wave comprises first and second operational amplifiers coupled together to generate a fixed frequency square wave, said first operational amplifier having an input form a current sensor which senses the current supplied to the semiconductor switches, and said second operational amplifier having an input from a control resistor, the magnitude of the resistance of which controls the current supplied to the ozonator by controlling the width of the pulses in the square wave output signal.

19. A current source inverter power supply circuit for an ozonator as claimed in claim 17, further comprising an amplifier means coupled to the output of said square wave circuit generating means, and an inductor coupled to the output of said amplifier means for smoothing and filtering the current supplied therethrough to the semiconductor switches.

20. A current source inverter power supply circuit for an ozonator as claimed in claim 15, said adjustable current pulse amplitude control circuit comprising a current detector means for detecting the current supplied through said semiconductor switch bridge inverter to obtain a current signal, means for producing a direct current voltage source, and osillator means for generating an output control signal for controlling the amplitude of the substantially rectangular current pulse of alternating polarity in accordance with said direct current voltage source and said current signal.

21. A current source inverter power supply circuit for an ozonator as claimed in claim 20, said oscillator means comprising first and second operational amplifiers coupled together to generate said output control signal, said first operational amplifier having an input from said current detector means and said second operational amplifier having an input from said direct curent voltage source means.

* * * * *